United States Patent Office 2,836,539
Patented May 27, 1958

2,836,539
4,6-DIAMINO-1-(4-LOWER ALKYLMERCAPTOPHENYL)-1,2 - DIHYDRO - 1,3,5 - TRIAZINES AND PREPARATION THEREOF

Royal A. Cutler, West Sand Lake, N. Y., assignor to Sterling Drug Inc., New York, N. Y., a corporation of Delaware No Drawing. Application February 29, 1956
Serial No. 568,432

14 Claims. (Cl. 167—53.1)

This invention relates to 4,6-diamino-1-(lower alkylmercaptophenyl)-1,2-dihydro - 2 - (lower alkyl)-2-(R)-1,3,5-triazines having the formula

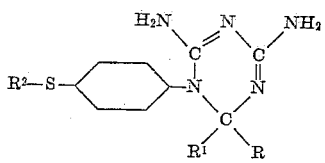

where $R^1$ and $R^2$ are lower alkyl radicals and R is hydrogen or a lower alkyl radical and to the preparation of the same.

The new compounds of my invention have valuable properties as potentiating components of chemotherapeutic compositions and also have useful chemotherapeutic properties, for example as anticoccidial, oxyuricidal, and antimalarial agents, as described more particularly hereinbelow.

The preparation of the compounds of my invention is carried out by interacting a 1-(4-lower alkylmercaptophenyl)-biguanide and a lower aliphatic carbonyl compound, i. e. aldehyde or ketone, having the formula $R^1$—CO—R, where R and $R^1$ have the significance indicated hereinabove, in the presence of a strong acid. Preferably, at least one equivalent proportion of the strong acid is employed. The reactants are heated together, preferably in water or in an aqueous alcoholic solution or in an excess of the lower aliphatic carbonyl compound, and the desired product can be obtained directly from the reaction mixture in the form of a salt of the strong acid employed; or, if the free base form of the product is desired, the salt is treated with the calculated amount of a strong base such as sodium hydroxide. The reaction proceeds in accordance with the following equation:

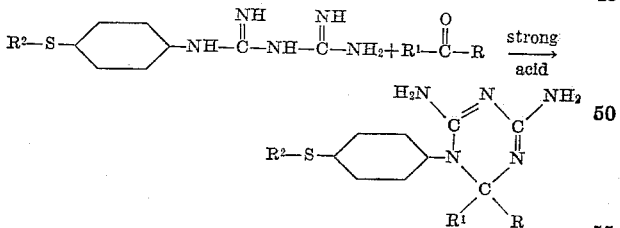

By the term "lower alkyl" used in the definitions of R, $R^1$, and $R^2$, I mean to indicate alkyl radicals of low molecular weight such as methyl, ethyl, isopropyl, butyl, and the like. I particularly prefer the lower alkyl radicals having 1, 2, 3 or 4 carbon atoms. Accordingly, as the 1-(4-lower alkylmercaptophenyl)biguanide in the foregoing process, there can be employed, for example, 1-(4-methylmercaptophenyl)biguanide, 1-(4-ethylmercaptophenyl)biguanide, 1 - (4 - propylmercaptophenyl)biguanide, 1-(4-butylmercaptophenyl)biguanide, and 1-(4-isopropylmercaptophenyl)biguanide. The lower aliphatic aldehyde or ketone, $R^1$—CO—R is, for example, acetaldehyde, propionaldehyde, butyraldehyde, isobutyraldehyde, acetone, diethyl ketone, and the like. The 1-(4-lower alkylmercaptophenyl)biguanide can be employed in the form of the free base or in the form of a mono- or di-salt, such as the monohydrochloride or dihydrochloride.

The strong acid employed in carrying out the preparation of my new compounds can be either a strong inorganic acid or a strong organic acid, but advantageously the acid is a strong mineral acid and in particular I prefer to employ hydrochloric acid.

The 1-(4-lower alkylmercaptophenyl)biguanides employed as starting materials in the above process are readily prepared by interacting a 4-(lower alkylmercapto) aniline and dicyanodiamide in the presence of a strong acid.

I have found that it is somewhat more convenient in the preparation of the compounds of my invention which are derived from lower aliphatic ketones to interact a 4-(lower alkylmercapto)aniline, a lower aliphatic ketone, and dicyanodiamide in the presence of a strong acid, thus avoiding the necessity for isolating the 1-(4-lower alkylmercaptophenyl)biguanide which is derivable by interaction of the 4-(lower alkylmercapto)aniline and dicyanodiamide components. In this reaction, if desired, the lower aliphatic ketone can be employed in excess of the theoretical amount required as a reactant to serve as a solvent medium. The overall reaction proceeds in accordance with the following equation:

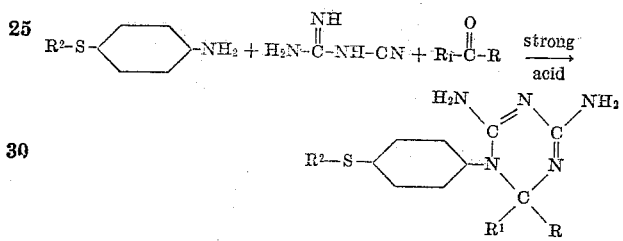

The new compounds of my invention are basic substances which react in the characteristic manner of amines with organic and inorganic acids to form salts, for example the hydrochlorides, the hydrobromides, the citrates, the tartrates, the sulfates, and the like. Depending on the solubility characteristics desired, my new compounds can be employed either in the form of the free base or in the form of a salt.

My invention is illustrated by the following examples without, however, being limited thereto.

EXAMPLE 1

4,6-diamino-1-(4-methylmercaptophenyl)-1,2-dihydro-2,2-dimethyl-1,3,5-triazine

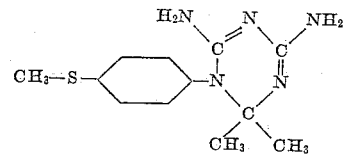

29.4 g. of 4-(methylmercapto)aniline was dissolved in 300 ml. of acetone. This solution was warmed to about 50° C. and there was then added 17.4 g. of dicyanodiamide. To the mixture there was added 18 ml. of concentrated hydrochloric acid. On addition of the acid all of the solid material went into solution and within about five minutes a solid separated from the clear solution. After one hour of stirring and warming at reflux temperature, the separated solid went back into solution, and after about forty minutes a solid separated from the reaction mixture in the form of needles. The reaction mixture was then refluxed for four hours and then chilled with stirring to 0° C. The tan needles which had separated from the reaction mixture were collected on a filter, washed with a few milliliters of cold acetone to remove most of the color from the solid, and the product was then sucked dry on the filter and air dried overnight (about fifteen hours). The product thus obtained, which was 4,6-diamino-1-(4-methylmercaptophenyl)-1,2-dihydro-2,2-dimethyl-1,3,5-triazine hydrochloride, weighed 40.7 g. and melted at 205–207° C. After three recrystallizations from three volumes of water containing two drops of concentrated hydrochloric acid there was obtained 16.5 g. of the pure substance in the form of white needles which melted at 205–208° C.

*Analysis.*—Calcd. for $C_{12}H_{17}N_5S \cdot HCl$: Cl, 11.83%; N, 23.36%. Found: Cl, 11.69%; N, 23.44%.

1.0 g. of the hydrochloride salt obtained as described above was dissolved in 10 ml. of boiling water and to this solution there was added 0.27 ml. of 35% aqueous sodium hydroxide solution. The reaction mixture was immediately cooled and the white solid which separated was collected on a filter. There was thus obtained 0.75 g. of 4,6-diamino-1-(4-methylmercaptophenyl)-1,2-dihydro-2,2-dimethyl-1,3,5-triazine monohydrate which melted at 147–149° C.

*Analysis.*—Calcd. for $C_{12}H_{17}N_5S \cdot H_2O$: S, 11.39%. Found: S, 11.18%.

The $LD_{50}$ values (dose causing death in 50% of the animals) for the hydrochloride as estimated by the method of Miller and Tainter [Proc. Soc. Exp. Biol. Med. 57, 261 (1944)], were $7.0 \pm 0.4$ mg./kg., intravenously, and 62.5 mg./kg., intraperitoneally, in the mouse.

EXAMPLE 2

*4,6-diamino-1-(4-ethylmercaptophenyl)-1,2-dihydro-2,2-dimethyl-1,3,5-triazine*

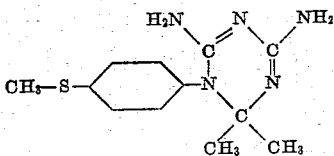

A mixture of 64 g. of 4-(ethylmercapto)aniline hydrochloride, 640 ml. of acetone, 27.8 g. of dicyanodiamide and 1 ml. of concentrated hydrochloric acid was heated under reflux for five hours. The reaction mixture was then cooled to 0° C. and the yellow solid which separated from the mixture was collected on a filter, washed with acetone and sucked dry on the filter. There was thus obtained 93.5 g. of solid which melted at 213–215° C. This product, which was 4,6-diamino-1-(4-ethylmercaptophenyl)-1,2-dihydro-2,2-dimethyl-1,3,5-triazine hydrochloride, was recrystallized twice from water containing a small amount of hydrochloric acid, with charcoal treatment, to yield a pale yellow solid melting at 210–225° C.

*Analysis.*—Calcd. for $C_{13}H_{19}N_5S \cdot HCl$: Cl, 11.30%; N, 22.33%. Found: Cl, 10.98%; N, 22.58%.

2.2 g. of the hydrochloride salt obtained as described above was dissolved in 11.0 ml. of boiling water and 0.64 ml. of 35% aqueous sodium hydroxide solution was added to the hot solution. The pale yellow solid which separated immediately was collected after the mixture had been rapidly chilled in ice water. There was thus obtained 1.15 g. of 4,6-diamino-1-(4-ethylmercaptophenyl)-1,2-dihydro-2,2-dimethyl-1,3,5-triazine, which melted at 132–139° C.

*Analysis.*—Calcd. for $C_{13}H_{19}N_5S$: N, 25.25%; S, 11.56%. Found: N, 25.15%; S, 11.23%.

The approximate $LD_{50}$ value for the hydrochloride was greater than 1000 mg./kg., perorally in the mouse.

EXAMPLE 3

*4,6-diamino-1-(4-methylmercaptophenyl)-1,2-dihydro-2-(n-propyl)-1,3,5-triazine*

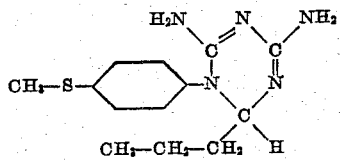

A mixture of 11.0 g. of 4-(methylmercapto)aniline, 6.5 ml. of concentrated hydrochloric acid, 6.6 g. of dicyanodiamide, and 25 ml. of water was heated under reflux with stirring for one hour. The resulting red solution was then chilled, thereby causing the separation of 15.0 g. of 1-(4-methylmercaptophenyl)biguanide hydrochloride in the form of a pink solid which melted at 215–217° C. A portion of this salt was converted to the free base form in the following manner. 2.5 g. of the 1-(4-methylmercaptophenyl)biguanide hydrochloride was dissolved in 15 ml. of water containing one drop of concentrated hydrochloric acid, decolorizing charcoal was added to the solution, and the mixture was filtered. To the hot filtrate there was added 0.92 ml. of 35% aqueous sodium hydroxide solution. The red oil which separated from the hot solution solidified on cooling. This solid, which weighed 1.8 g. and melted at 147–150° C., was recrystallized twice from water containing a small amount of ethanol. There was thus obtained 0.25 g. of 1-(4-methylmercaptophenyl)biguanide as yellow platelets which melted at 153–154° C.

*Analysis.*—Calcd. for $C_9H_{13}N_5S$: N, 31.37%. Found: N, 31.36%.

6.0 g. of 1-(4-methylmercaptophenyl)biguanide hydrochloride was dissolved in a mixture of 1.95 ml. of concentrated hydrochloric acid and 65 ml. of water. To this solution there was added 32.8 g. of n-butyraldehyde and the resulting mixture was heated to 50° C. for four hours. The reaction mixture was then heated with decolorizing charcoal and filtered. The filtrate was evaporated under reduced pressure to about one-half its original volume, and the residue was heated with decolorizing charcoal and filtered. 60 ml. of ether was added to the yellow filtrate and the mixture was chilled to 0–5° C. To the cold mixture there was added 5.4 ml. of 35% aqueous sodium hydroxide solution. The yellow solid thereby precipitated was collected on a filter, washed with ether, and partially dried. 1.0 g. of the slightly damp product (about one-sixth of the total yield) was dissolved in a mixture of 3.5 ml. of water and 5.0 ml. of 3 N hydrochloric acid. This solution was treated with decolorizing charcoal, filtered, and the filtrate was chilled to about 0° C. Concentrated ammonium hydroxide solution was added to the cold solution until almost all of the hydrochloric acid had been neutralized, leaving the solution slightly acidic. From this solution there separated 0.75 g. of a pale blue solid. This product, which consisted of 4,6-diamino-1-(4-methylmercaptophenyl)-1,2-dihydro-2-(n-propyl)-1,3,5-triazine hydrochloride, was recrystallized from ethanol. The purified product melted at 230–232° C.

*Analysis.*— Calc'd. for $C_{13}H_{20}ClN_5S$: Cl, 11.30%. Found: Cl, 11.38%.

The hydrochloride salt obtained above was converted to the free base by treatment with sodium hydroxide in aqueous solution. The 4,6-diamino-1-(4-methylmercaptophenyl)-1,2-dihydro-2-(n-propyl)-1,3,5-triazine was obtained as a white solid which melted at 143–145° C.

The approximate $LD_{50}$ for the hydrochloride was 2500 mg./kg., perorally in the mouse.

EXAMPLE 4

*4,6-diamino-1-(4-ethylmercaptophenyl)-1,2-dihydro-2-methyl-2-(n-propyl)-1,3,5-triazine*

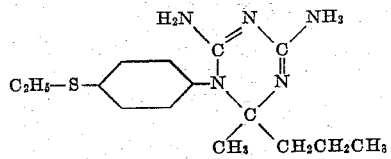

229 g. of 4-(ethylmercapto)aniline hydrochloride was dissolved in 550 ml. of hot water and to the hot solution there was added 91.5 g. of dicyanodiamide. The mixture was heated under reflux for one hour and was then chilled with stirring. The light tan solid which separated from solution was collected on a filter. This product, which was 1-(4-ethylmercaptophenyl)biguanide hydrochloride, weighed 139 g. and melted at 192–195° C.

The hydrochloride salt obtained as described above was converted to the free base by treatment with aqueous sodium hydroxide solution. The 1-(4-ethylmercaptophenyl)biguanide thus obtained melted at 147–149° C.

*Analysis.*—Calc'd. for $C_{10}H_{15}N_5S$: S, 13.51%. Found: S, 13.50%.

By interacting the 1-(4-ethylmercaptophenyl)biguanide hydrochloride obtained as described above with methyl propyl ketone in the presence of hydrochloric acid, there is obtained 4,6-diamino-1-(4-ethylmercaptophenyl)-1,2-dihydro-2-methyl-2-(n-propyl)-1,3,5-triazine hydrochloride, which by treatment with sodium hydroxide is converted to the free base.

ANTICOCCIDIAL ACTIVITY 2,2'-thiobis(2,4-dichlorophenol), also designated as bithionol, having the structural formula

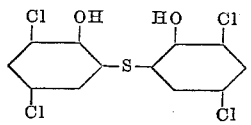

has useful anticoccidial activity, as discovered by Frederick Coulston and Emery W. Dennis, adapting it to use, by addition to the food of the fowl, for the control of coccidial infection in fowl, in which various species of the genus Eimeria, for instance *Eimeria tenella*, are the etiological agents. The above-described new dihydrotriazine derivatives of my invention are particularly useful in combination with bithionol to provide synergistic or potentiated mixtures having a greater anticoccidial effect than the sum of the anticoccidial effects of the individual ingredients. In particular, my dihydrotriazine derivatives potentiate the anticoccidial activity of bithionol at concentration levels of the dihydrotriazine derivative which show no useful anticoccidial activity when the dihydrotriazine derivative is used alone. These mixtures are especially useful in the control of cecal coccidiosis in poultry. To obtain the synergistic action between the compounds of my invention and bithionol, these two ingredients are incorporated into the same compositions in any suitable fashion, as by mixing the dihydrotriazine derivative and bithionol as dry powders, to which an inert substance such as starch or talc can be added if desired; or more conveniently when the mixture is to be administered with feeds, the dihydrotriazine derivative and the bithionol are dispersed in finely ground form in the feed employed as a sole or partial ration for the poultry.

In the anticoccidial mixtures, the proportions of the dihydrotriazine derivative and the bithionol can be varied somewhat depending on such factors as the type of infecting organism, the virulence of the organism, degree of infection, and the like. Generally speaking, satisfactory results have been obtained by employing about 5–50 parts of bithionol per one part of the dihydrotriazine derivative by weight. These synergistic mixtures have a high anticoccidial activity and the birds are healthy throughout medication, and the mixture has no deleterious effect on the quality, fertility, and hatchability of eggs from the medicated birds. Only a relatively small dose of the mixture per bird per day is necessary for the effective control of coccidiosis in poultry. Thus, good results are obtained when each bird is fed daily poultry feed containing about 0.05–1% of the synergistic mixture. For example, commercial poultry mash containing 0.005% by weight of 4,6-diamino-1-(4-methylmercaptophenyl)-1,2-dihydro-2,2-dimethyl-1,3,5-triazine hydrochloride, described above in Example 1, and 0.1% of bithionol by weight was fed to White Leghorn and White Rock Cross chickens infected with *Eimeria tenella*. The medicated feed was very effective in substantially eliminating the coccidial infection from the chickens and was considerably more effective than a similar feed of high anticoccidial activity containing bithionol alone at a concentration of 0.1% by weight. This result is a surprising one since under comparable treatment conditions 4,6-diamino-1-(4-methylmercaptophenyl)-1,2-dihydro-2,2-dimethyl-1,3,5-triazine hydrochloride had no discernible anticoccidial effect against *Eimeria tenella* infections in chickens at a concentration of 0.005% by weight in poultry feed and was only slightly effective even at a concentration of 0.1% by weight.

In sharp contrast with the advantageous results obtained with the mixture of bithionol and my new 4,6-diamino-1-(4-methylmercaptophenyl)-1,2-dihydro-2,2-dimethyl-1,3,5-triazine hydrochloride as described above, a medicated poultry feed containing 0.1% of bithionol and 0.005% of the known 4,6-diamino-1-(4-methoxyphenyl)-1,2-dihydro-2,2-dimethyl-1,3,5-triazine hydrochloride, by weight, was not effective to control coccidial infections in chickens under similar test conditions and in fact this mixture was considerably less effective than medicated feed containing 0.1% by weight of bithionol alone.

My novel dihydrotriazine derivatives per se also have useful anticoccidial activity in poultry, for example at concentrations of about 0.25%–0.5% by weight in poultry feed.

ANTHELMINTIC ACTIVITY

The compounds of my invention have useful anthelmintic activity, for instance being active against the oxyurid worms *Syphacea obvelata* and *Aspicularis tetraptera*. Thus, for example, peroral administration of 4,6-diamino-1-(4-methylmercaptophenyl)-1,2-dihydro-2,2-dimethyl-1,3,5-triazine hydrochloride eliminated helminths from 11 out of 20 mice at a dosage level of 200 mg./kg./day and from 9 out of 15 mice at 400 mg./kg./day. 4,6-diamino-1-(4-methylmercaptophenyl)-1,2-dihydro-2-(n-propyl)-1,3,5-triazine hydrochloride eliminated helminths from 9 out of 19 mice at a dosage level of 200 mg./kg./day.

ANTIMALARIAL ACTIVITY

The dihydrotriazines of my invention are useful for potentiating the activity of antimalarial agents. Thus, combined medication with a mixture of an antimalarial agent and one of my dihydrotriazine derivatives permits a more rapid clearance of parasitemia and prolongs the time interval between clearance and relapse with a substantially lower dose of the antimalarial agent. For example, rhesus monkeys with sporozoite induced *Plasmodium cynomolgi* infection and having approximately 500 parasites per 50,000 red blood cells were medicated once daily for three consecutive days with mixtures of 7-chloro-4-[4-(N-ethyl-N-beta-hydroxyethylamino)-1-methylbutylamino]quinoline (I), and 4,6-diamino-1-(4-methylmercaptophenyl)-1,2-dihydro-2,2-dimethyl-1,3,5-triazine hydrochloride (II) prepared so as to provide: to one group of monkeys 5 mg. of I and 2.5 mg. of II per kilogram per day; to a second group, 5 mg. of I and 5.0 mg. of II/kg./day; and to a third group 5 mg. of I and 10.0 mg. of II/kg./day. In each instance, the medication eliminated the parasites from the peripheral blood of the monkeys significantly more rapidly than did 5 mg./kg./day of I or 10 mg./kg./day of II, and moreover there was a marked prolongation of the time interval between clearance and relapse in the cases of the mixtures as compared with a 5 mg./kg./day dosage of I and a 10 mg./kg./day dosage of II. Marked potentiation of the antimalarial activity of chloroquine diphosphate by 4,6-diamino-1-(4-methylmercaptophenyl)-1,2-dihydro-2,2-dimethyl-1,3,5-triazine was demonstrated by following a test procedure similar to the foregoing.

My novel compounds per se have antimalarial activity when administered at appropriate concentration, for example as demonstrated by oral administration at levels of 12.5–50 mg./kg./day in ducks infected with *Plasmodium lophurae*.

This application is a continuation-in-part of my copending U. S. patent application Serial No. 406,880, filed January 28, 1954, now abandoned.

I claim:

1. A member of the class consisting of 4,6-diamino-1-(4-lower alkylmercaptophenyl) - 1,2-dihydro-2-(lower alkyl)-2-(R)-1,3,5-triazines having the formula

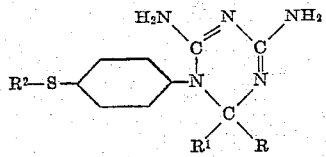

where $R^1$ and $R^2$ are lower alkyl radicals and R is a member of the class consisting of hydrogen and lower alkyl radicals, and acid addition salts thereof.

2. A 4,6-diamino-1-(4-lower alkylmercaptophenyl)-1,2 - dihydro - 2 - (lower alkyl) - 1,3,5 - triazine having the formula

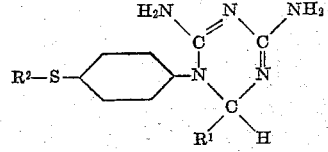

where $R^1$ and $R^2$ are lower alkyl radicals.

3. A 4,6-diamino-1-(4-lower alkylmercaptophenyl)-1,2-dihydro-2,2-di-(lower alkyl)-1,3,5-triazine having the formula

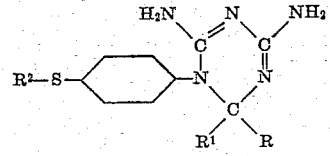

where R, $R^1$, and $R^2$ are lower alkyl radicals.

4. 4,6-diamino-1-(4 - methylmercaptophenyl) - 1,2 - dihydro-2,2-dimethyl-1,3,5-triazine having the formula

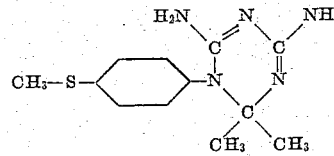

5. 4,6-diamino-1-(4-ethylmercaptophenyl) - 1,2 - dihydro-2,2-dimethyl-1,3,5-triazine having the formula

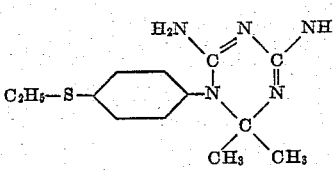

6. 4,6-diamino-1-(4 - methylmercaptophenyl) - 1,2 - dihydro-2-(n-propyl)-1,3,5-triazine having the formula

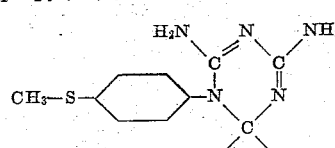

7. The process for preparing a 4,6-diamino-1-(4-lower alkylmercaptophenyl)-1,2-dihydro-2-(lower alkyl)-2-(R)-1,3,5-triazine having the formula

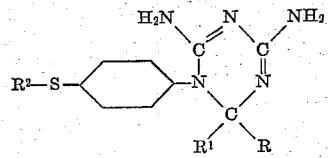

where $R^1$ and $R^2$ are lower alkyl radicals and R is a member of the class consisting of hydrogen and lower alkyl radicals, which comprises interacting a 1-(4-lower alkylmercaptophenyl)biguanide and a lower aliphatic carbonyl compound having the formula $R^1$—CO—R in the presence of a strong acid.

8. The process for preparing a 4,6-diamino-1-(4-lower alkylmercaptophenyl)-1,2-dihydro - 2 - (lower alkyl) - 2-(R)-1,3,5-triazine having the formula

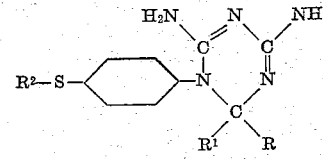

where $R^1$ and $R^2$ are lower alkyl radicals and R is a member of the class consisting of hydrogen and lower alkyl radicals, which comprises interacting a 1-(4-lower alkylmercaptophenyl)biguanide and a lower aliphatic carbonyl compound having the formula $R^1$—CO—R in the presence of hydrochloric acid.

9. The process for preparing a 4,6-diamino-1-(4-lower alkylmercaptophenyl)-1,2-dihydro - 2 - (lower alkyl) - 2-(R)-1,3,5-triazine having the formula

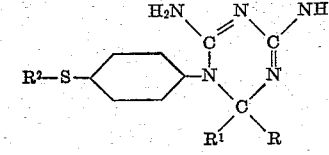

where R, $R^1$ and $R^2$ are lower alkyl radicals which comprises interacting a 4-(lower alkylmercapto)aniline, a lower aliphatic ketone having the formula $R^1$—CO—R, and dicyanodiamide in the presence of a strong acid.

10. The process for preparing 4,6-diamino-1-(4-methylmercaptophenyl)-1,2-dihydro-2,2-dimethyl - 1,3,5-triazine which comprises interacting 4-(methylmercapto)aniline, acetone, and dicyanodiamide in the presence of hydrochloric acid.

11. The process for preparing 4,6-diamino-1-(4-ethylmercaptophenyl)-1,2-dihydro - 2,2 - dimethyl - 1,3,5 - triazine which comprises interacting 4-(ethylmercapto)aniline, acetone, and dicyanodiamide in the presence of hydrochloric acid.

12. An anticoccidial composition comprising a mixture of a 4,6-diamino-1-(4-lower alkylmercaptophenyl)-1,2-dihydro-2-(lower alkyl)-2-(R)-1,3,5-triazine having the formula

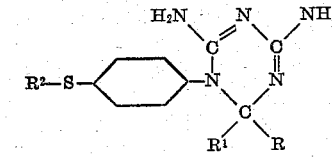

where $R^1$ and $R^2$ are lower alkyl radicals and R is a member of the class consisting of hydrogen and lower alkyl radicals, and 2,2'-thiobis(2,4-dichlorophenol).

13. An anticoccidial composition comprising a mixture of 4,6-diamino-1-(4-methylmercaptophenyl)-1,2-dihydro-2,2-dimethyl-1,3,5-triazine and 2,2'-thiobis(2,4-dichlorophenol).

14. A composition for the control of coccidiosis in poultry which comprises a poultry feed and dispersed therein in anticoccidially effective amount small proportions by weight of 4,6-diamino-1-(4-methylmercaptophenyl)-1,2-dihydro-2,2-dimethyl-1,3,5-triazine and 2,2'-thiobis(2,4-dichlorophenol).

References Cited in the file of this patent

FOREIGN PATENTS 505,787   Belgium _____ Mar. 12, 1952

OTHER REFERENCES

R. Fusco et al.: Boll. Soc. Ital. Biol. Sper. 27: 1730–1732 (1951).

Foley: Proc. Soc. Exptl. Biol. Med. 83: 733–739 (1953).